March 15, 1932. J. R. GAMMETER 1,849,828
VULCANIZING APPARATUS
Filed May 31, 1930  2 Sheets-Sheet 2
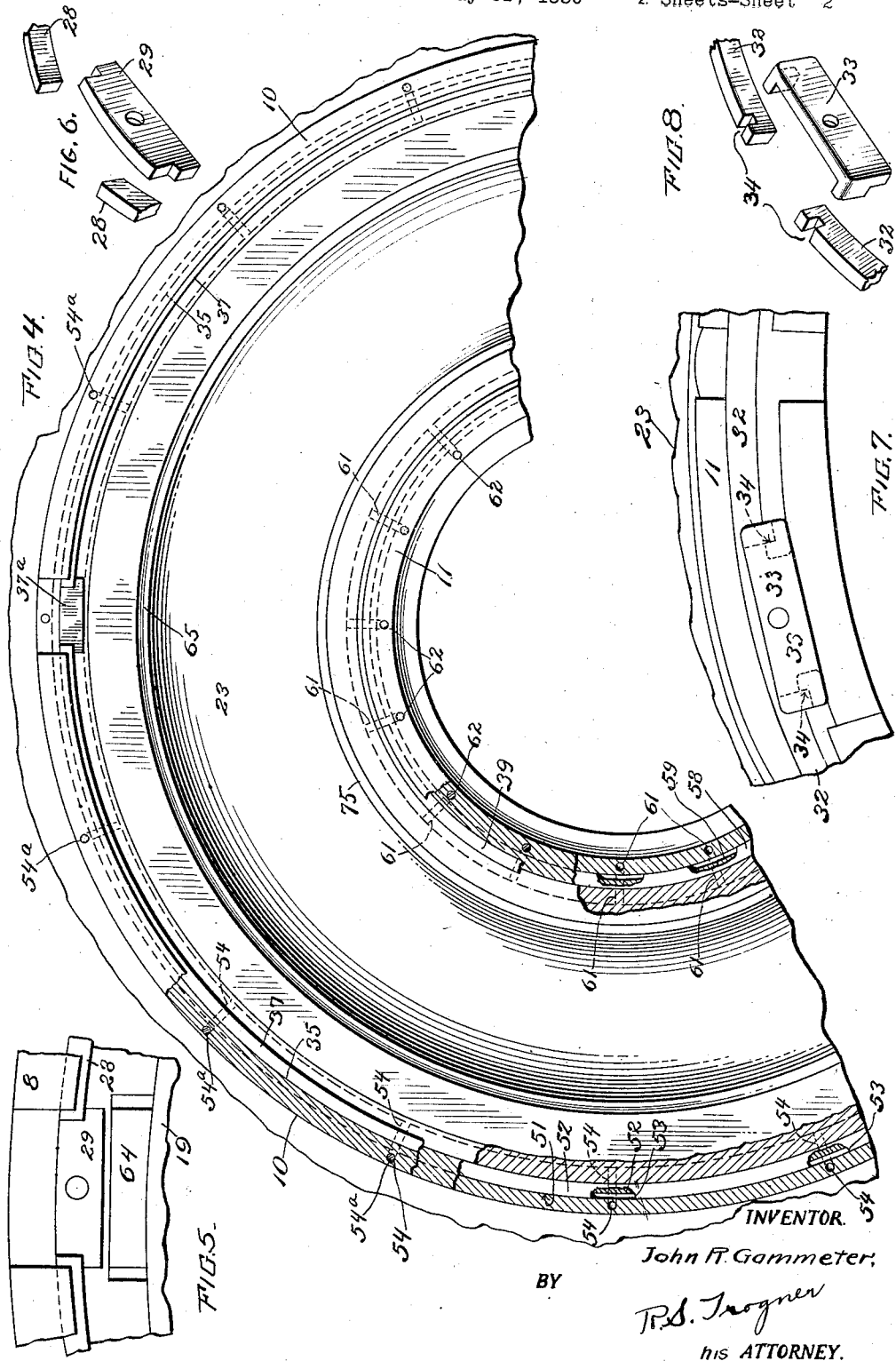
INVENTOR.
John R. Gammeter,
BY
R. S. Trogner
his ATTORNEY.

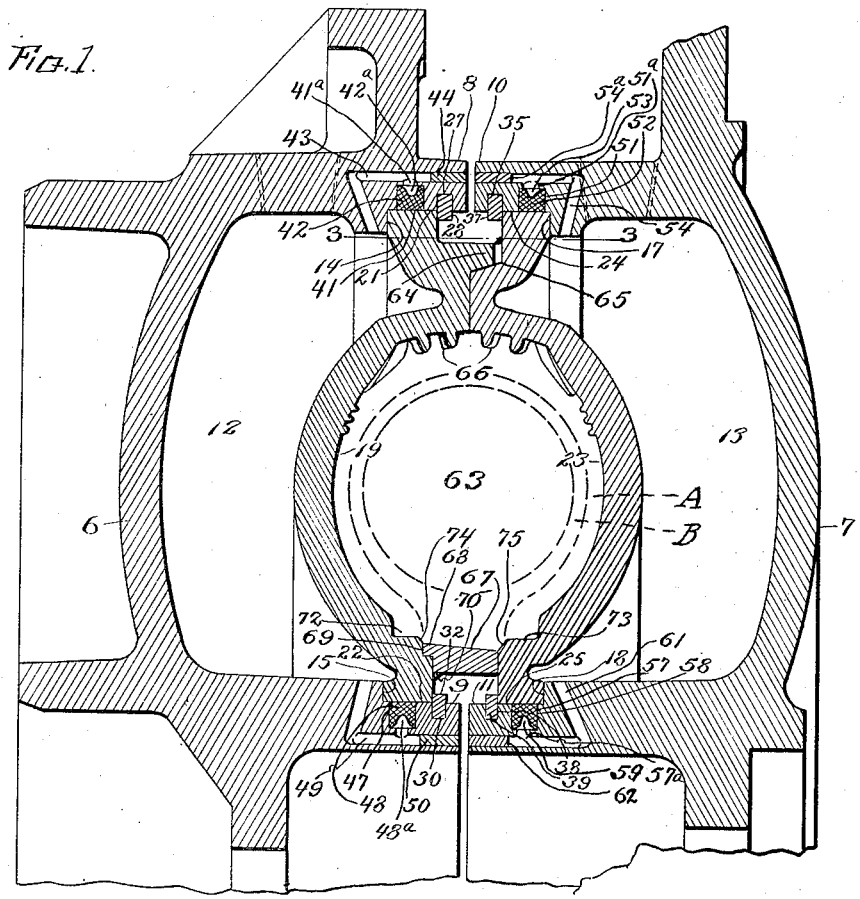

Patented Mar. 15, 1932

1,849,828

UNITED STATES PATENT OFFICE

JOHN R. GAMMETER, OF AKRON, OHIO

VULCANIZING APPARATUS

Application filed May 31, 1930. Serial No. 457,712.

This invention relates to apparatus for vulcanizing rubber articles such as pneumatic tires and the like. In familiar devices of this character, the mold cavities and their associated heating chambers have been formed in integral cored-out castings. As the devices are thus constructed, their manufacture or repair is both troublesome and expensive. Moreover, by reason of the varying thickness of the mold walls, it is difficult to obtain the uniform heating of the mold surfaces, thus giving rise to the undercuring of the tires at certain portions and causing their rapid deterioration when in service. Furthermore, due to the integral or permanent nature of the mold walls, the devices are adapted for use only in connection with tires of a single size and of a single design.

The present invention is intended to overcome the foregoing and other objections, and aims to produce a tire-vulcanizing device which is of simple mechanical construction, thoroughly efficient in operation, and capable of use with tires of various sizes and designs. To attain these objects, the invention, generally speaking, contemplates the formation of the mold cavities and the heating chambers in separate or distinct parts which are made to fit together in fluid-tight condition, and which are detachably connected in such manner as to permit the ready removal and replacement of the mold sections when desired.

The invention also aims to facilitate and expedite the insertion and removal of the tires in and from the individual mold cavities, and in this connection contemplates the employment of a cone-shaped air bag ring for the closure of the inner side of the mold cavity during vulcanization.

These and various other features will be fully pointed out in the detailed description which follows.

In the accompanying drawings:

Fig. 1 is a fragmentary vertical transverse sectional view through one form of vulcanizing mold embodying the invention;

Fig. 2 is a fragmentary detail perspective view of a portion thereof on an enlarged scale;

Fig. 3 is a fragmentary detail sectional view approximately on line 3—3 of Fig. 1;

Fig. 4 is a fragmentary plan view of the inner or parting face of one half of the mold with parts broken away and parts in section;

Fig. 5 is a detail elevation of the locking means for the meeting ends of the outer snap-ring;

Fig. 6 is a fragmentary perspective view of the same, showing the parts disassembled;

Fig. 7 is a detail elevation of the locking means for the inner snap-ring; and

Fig. 8 is a fragmentary perspective view of the same with the parts disassembled.

The vulcanizing device made in accordance with the preferred embodiment of the invention illustrated in the drawings, is of a type suitable for use in various kinds of heaters, such as the well-known watchcase heaters and book-type vulcanizers, and comprises a pair of oppositely disposed separable vulcanizing members. These members include annular concave casing sections or jackets 6 and 7, see Fig. 1, presenting, respectively, outer and inner peripheral walls 8, 9 and 10, 11. The respective casing sections contain heating chambers 12, 13, whose inner side walls are formed by mold rings or sections 19 and 23, presently to be described. The heating chambers may be heated in any suitable manner, as by means of steam introduced into the chambers through pipes, not shown, in a well-known manner. In order to provide proper contact for the mold sections and secure engagement therefor, the inner faces of the walls 8, 9 of the casing section 6 are formed with inwardly extending side-seating shoulders 14, 15, respectively, and the walls 10, 11 of casing section 7 are provided on their inner faces with similar shoulders 17, 18, respectively.

The mold sections referred to are of annular, concave shape and are adapted, when placed in their opposed or cooperating positions, to form between them a mold cavity or chamber to receive the tire or other article to be vulcanized. As is well shown in Fig. 1, the mold section 19 is formed to seat on the walls of the casing section 6, and for this purpose its outer and inner peripheral walls 21, 22 are shaped to fit snugly in the recesses formed by the inner faces of the respective walls 8, 9 and shoulders 14, 15 of the casing section 6 so as thus to form the side wall for the annular steam chamber 12. In like manner, the annular, concave mold section 23 is provided to seat on the walls of the casing section 7, its outer and inner peripheral walls 24, 25 shaped to fit snugly in the recesses formed by the inner faces of the respective walls 10, 11 and shoulders 17, 18 of said casing section 7 and thus form the side wall for the annular steam chamber 13.

In order to hold the mold sections securely but removably in their seating positions on the casing sections, the novel expedient is employed of forming perimetrical grooves in the walls of the casing sections and of placing in said grooves splitlocking rings which shall bear against the outside surfaces of the mold sections.

Preferably and as shown, see Fig. 1, the inner peripheral face of the outer wall 8 of the casing section 6 is formed with an annular groove 27, and in this groove there is placed a detachable abutment or stop in the form of a split snap-ring 28, which projects inwardly therefrom and bears against the adjoining outer surface of the wall 21 of the mold section 19, the groove 27 being for such purpose formed immediately adjacent said adjoining surface. If desired, and to impart increased stability and rigidity to the locking ring 28, its opposite ends are held apart by a removable key 29, see Fig. 5, which is sprung between the said ends and frictionally engages the same to prevent contraction of the snap-ring 28 and its removal from the groove 27.

Further, to facilitate the locking engagement of the two sections 6 and 19, an annular groove 30 is formed in the outer peripheral face of the inner wall 9 of the casing section 6, immediately adjacent the outer surface of the wall 22 of the mold section 19, and in this groove another snap-ring 32 is arranged, this ring projecting inwardly from the groove and bearing against the said outer surface of the mold section wall 22. This ring 32, like the ring 28, and for similar reasons, is likewise provided with a removable key 33, shaped as shown in Figs. 7 and 8, and the inwardly extending ends of which interlock in recesses 34 formed in the ends of the ring.

A similar construction of parts in this particular is provided for the casing section 7 and mold section 23, the inner peripheral face of the outer wall 10 being formed with an annular groove 35 immediately adjacent the outer surface of the wall 24 of the mold section 23, and a snap-ring 37 being arranged in said groove with a portion projecting inwardly and bearing tightly against said outer surface of the mold section wall 24. This ring is provided with a key 37ª. Likewise, the inner wall 11 of the casing section 7 is formed with a groove 38 to receive a snap-ring 39, which is adapted to bear against the adjacent outer surface of the wall 25 of the mold section 23. This snap-ring is completed with a key, not shown, substantially identical with the key 33.

It will be seen that, with this novel formation and arrangement of parts, the mold sections can be easily and quickly mounted on their respective casing sections and secured in place thereon by the ready insertion of the pair of snap-rings in their retaining grooves, see Fig. 1, and can be as easily and quickly dismounted by the ready removal of the snap-rings from the retaining grooves. Hence, many different mold sections can be interchangeably used with the casing sections, these different mold sections being adapted to accommodate tires of different sizes or with different tread designs.

The mold sections are held forwardly against the snap-rings 28, 32, 37 and 39 by the steam pressure in back of them, contained in the chambers 12 and 13.

Obviously, it is desirable and in fact necessary that the jointure between the walls of the mold sections and their respective casing sections be steam-tight. To effect this steam-tight engagement, and describing first the engagement of the casing section 6 and mold section 19, there is formed in the inner peripheral face of the outer wall 8 of the casing section 6, adjacent to the shoulder 14, an annular recess 41 of a width less than the thickness of the wall 21 of the mold section. In this recess 41, there is arranged a radially contractible packing member or ring 42, made of any suitable packing material, and which after the manner of its kind is made to fit tightly in said recess and bear snugly against the outer peripheral surface of the mold section wall 21, making a cylindrical telescopic or slip joint therewith, and against the side and inner walls of the recess. This packing ring is, of course, placed in position in its recess before the mold section is applied.

While the packing ring would of itself be effective for its purpose, yet the invention contemplates making a steam-tight joint of extreme efficiency and to this end, and according to another feature of the invention, it is proposed to use the force of the steam itself. As shown, therefore, the wall 8 of the casing section 6 is formed with a plurality of passageways 43 therein, which passageways establish communication between the steam chamber 12 and the annular recess 41 through short radial ports 41ª, the latter leading into the bottom of the annular recess, see Fig. 1. As will be apparent, the steam escaping from the steam chamber 12 through these passageways into the bottom of the recess 41 will act to press the packing member 42 tightly against the surface of the mold section wall 21 and thus effect the steam-tight closure desired. To facilitate and increase this packing effect, the packing member 42 is formed with an annular groove or furrow 42ª in its outer side of about the same diameter as the ports 41ª, providing a pair of flexible edge sealing lips, and into this furrow the steam flows and presses against all sides thereof, thus bringing about also a closer contact of the packing member 42 with the side walls of the recess 41.

It will be observed, see Fig. 1, that each of the passageways 43 takes the form of a V, having a long leg which extends parallel with the central axis of the casing and leads to the outer vertical surface of the casing section wall 8, and a shorter leg which extends semi-radially at an angle to said axis and leads to an inner face of the wall 8 adjacent the shoulder 14. Closure plugs 44 are inserted in the open ends of the long leg portions to prevent the escape of steam. This particular arrangement is preferred for reasons of convenience and economy in drilling the passageways.

The outer peripheral face of the inner wall 9 of the casing section 6 is in like fashion formed with an annular recess 47, in which is seated a radially expansible packing ring 48 bearing against the inner peripheral surface of the wall 22 of the mold section 19 and formed with a furrow 48ª in its opposite face. Passageways 49 (like the passageways 43) communicate between the steam chamber 12 and radial ports 47ª of the recess, all as shown in Figs. 1 and 2, and the outer ends of the passageways are closed with suitable plugs 50.

A like construction of parts obtains with reference to the casing section 7 and mold section 23, the inner peripheral face of the outer wall 10 of said casing section being formed with an annular recess 51, in which is arranged a packing ring 52, formed with a furrow 53 in its inner surface, and its outer face bearing against the peripheral surface of the outer wall 24 of the mold section 23. Passageways 54 communicate between the steam chamber 13 and said recess through radial ports 51ª, and the steam escaping from said chamber 13 will act upon the packing member 52 in the manner heretofore described, when referring to the similar parts of the casing section 6. In corresponding fashion, the outer peripheral face of the inner wall 11 of the casing section 7 is formed with an annular recess 57 in which is housed a packing ring 58 formed with a furrow 59 in its outer surface and bearing against the peripheral surface of the inner wall 25 of the mold section 23, and thus rendering the joint between the wall 11 and said wall 25 steam-tight. Passageways 61 communicate between the recess 57 and the steam chamber 13 through the radial ports 57ª in the manner heretofore described, the ends of said passageways being provided with suitable plugs 62.

By mounting these packing rings and forming the steam passageways 43 etc. in the casing sections, the expense of mounting and forming them in a multiplicity of interchangeable mold sections is avoided.

In the present instance, as before intimated, the mold sections 19 and 23 are made to define between them a mold cavity 63 of fixed size suitable for the vulcanization of a tire; and it will be observed, see Figs. 1 and 3, that the section 19 is formed with a double-beveled lug 64 adapted to seat in a correspondingly formed socket or recess 64 in the section 23, whereby to insure accurate registration (both axial and circumferential) of the mold sections and their tread designs 66. As shown, also, see Fig. 1, the shoulder 64 is so formed that proper space is afforded between the said shoulder and the inner face of the wall 8 so that after the mold section 19 has been placed in position, the snap-ring 28 can be inserted in its groove 27.

The uncured tire A and its air bag B are placed in one of the mold sections before the sections are joined or closed in operative position. Ordinarily, one of the casing sections with its associated mold section is maintained in stationary position (sections 6 and 19 herein), while the other casing section with its associated mold section (sections 7 and 23 herein) is moved or swung to engage and be held in locked engagement with the stationary casing section. The tire and air bag are customarily placed in the stationary mold section; and the other mold section and its casing section are then closed over it to form with the stationary sections the mold cavity 63 heretofore mentioned. In the art, the practice prevails of constructing the inner peripheral walls of the respective mold sections in such manner as to leave a wide space between their opposing annular surfaces, and in order to support the tire and air bag, it is customary first to mount the tire and the air bag on a rim, which requires a separate operation.

According to another important feature of this invention, this preliminary rimming operation is dispensed with. For this purpose, the mold sections 19 and 23 are made substantially equal and are formed directly with seats 72 and 73 for the tire beads, and there is provided an annular cone-shaped ring or member 67, which completely bridges the space between the opposing inner peripheral walls of the two mold sections, and upon which the tire and air bag are placed preparatory to the closing of the mold. The ring may be attached to either mold section 19 or 23 and in any suitable way, as by casting it integral with the section. Preferably, however, it is formed with an annular shoulder 68 interlocking with a coresponding shoulder 69 on the mold section 19, and is welded, as at 70, see Fig. 1, to the stationary mold section 19. According to this arrangement, as the swinging mold section 23 is brought into closed position, it will force or press the tire and air bag into proper position, with the beads of the tire fitting properly in their seats 72, 73, and the air bag resting upon and supported by the ring 67. It will be understood that, as the swinging mold section 23 presses against the tire, the latter will slide upwardly along the conical face of the ring 67 into proper position in the mold cavity. In this connection, it may be noted that the edges of the mold sections 19 and 23, adjoining the ring 67, are beveled or chamfered as at 74, 75, respectively, so as to avoid any sharp corners which might tend to hold the tire and air bag against movement or deface the same, while they are being pressed into proper vulcanizing position. After the vulcanizing members have been brought into operative or closed position, they are maintained in such position by suitable locking means, not shown.

Due to the removable nature of the mold sections, it is apparent that the device may be used for the vulcanization of tire casings of various sizes and designs, it simply being necessary to remove and re-insert the split locking rings before and after replacement of the mold sections. This interchangeability of the mold sections is greatly facilitated by reason of their shouldered portions which insure the proper location of the sections on the casing members as well as the mutual co-operation of such sections in the closed condition of the casing members. Moreover, being in the form of separate parts, the mold sections may be made of uniform thickness throughout so as thus to insure the uniform heating of all portions of the tire casings. This feature is further advantageous, in that it enables the device to be built without difficulty and at low cost and also provides for the ready repair or replacement of any broken or worn out parts. It is also pointed out that the use of the cone-shaped ring for the closure of the mold cavity is particularly desirable, inasmuch as the tire casings may be mounted within the mold cavity with the greatest possible convenience and without first "rimming-up" the casings. These and various other advantages will be readily appreciated by those skilled in the art.

The invention is not of course confined to the precise construction shown and described, nor to any other particular construction by which the same may be carried into effect, as many changes may be made in the details without departing from the main principles of the invention and without sacrificing its chief advantages. It is to be understood therefore that the invention is not limited to any specific form or embodiment, except insofar as such limitations are set forth in the appended claims.

Having thus described my invention, what I claim is:

1. In a vulcanizer, the combination of a forwardly-open casing section having a detachable abutment ring, a separable mold section having a cylindrical telescopic fit within said casing section and forming therewith a chamber adapted to contain pressure fluid which holds the mold section forwardly against said abutment ring, and a radially-acting packing ring located rearwardly of said abutment ring and exposed on one periphery to the fluid pressure within said chamber, for sealing by its opposite periphery the cylindrical joint between said casing and mold sections.

2. In a vulcanizer, the combination of a forwardly-open casing section having means for retaining a mold section against forward axial movement therein, a separable mold section having a cylindrical telescopic fit within said casing section and forming therewith a chamber adapted to contain pressure fluid which holds the mold section forwardly against said retaining means, and a radially-acting packing ring mounted in a groove on said casing section and grooved on its back to provide a pair of flexible sealing lips peripherally exposed to the fluid pressure within said chamber, for sealing said packing ring against the mold section and against the sides of its casing groove.

3. In a vulcanizer, the combination of a forwardly-open casing section provided with outer and inner cylindrical mold-section supporting surfaces and with mold-section retaining means located forwardly of said supporting surfaces, an annular separable mold section telescopically fitting said supporting surfaces and forming with the casing section an annular heating chamber adapted to contain steam pressure which holds said mold section forwardly against the retaining means, a radially contractible outer packing ring and a radially expansible inner packing ring mounted in respective casing grooves for sealing the telescopic joints between the casing section and mold section, the casing being formed with passages leading from said chamber to the backs of said casing grooves for exposing the back peripheries of the packing rings to the steam pressure in said chamber.

4. A vulcanizing device including, in combination, a casing section having outer and inner walls with annular seating surfaces, a separate mold section formed on its outer and inner walls with annular surfaces adapted to bear against the seating surfaces of the casing section and forming therewith a closed heating chamber, the surface of one of said sections being formed with an annular recess containing a packing ring, and a plurality of ports leading from said recess into the heating chamber and to the forward surface of the casing section, and closure plugs fitted into said ports from said outer surface.

5. In a vulcanizer, the combination of a forwardly-open casing section having means for retaining a mold section against forward axial movement therein, a separable mold section having a cylindrical telescopic fit within said casing section and forming therewith a chamber adapted to contain pressure fluid which holds the mold section forwardly against said retaining means, a radially-acting packing ring mounted in a groove on said casing section, and a series of passages connecting said chamber with the casing groove for admitting the chamber pressure to the back of said packing ring, said passages including approximately radial inlet portions and other portions substantially parallel with the central axis of the casing section, terminating in the forward face of said casing section and provided with closure plugs.

6. A tire vulcanizing device including, in combination, a pair of oppositely arranged annular mold sections adapted to be brought together in closed relation and formed with bead seats, the side walls of the two sections being formed to contact at the outer periphery but separated from each other at the inner periphery in the closed condition of the sections, and a cone-shaped ring bridging the gap between the mold sections at their inner periphery and by which the tire and its air bag are guided into and supported in proper position within the mold cavity when the mold is closed.

7. A tire vulcanizing device including, in combination, a pair of oppositely arranged annular mold sections adapted to be brought together in closed relation, and formed with bead seats, the side walls of the two sections being formed to contact at the outer periphery but separated from each other at the inner periphery in the closed condition of the sections, and a cone-shaped ring rigidly attached to one of the mold sections and bridging the gap between said sections at their inner periphery, as and for the purpose described.

8. A tire vulcanizing device including, in combination, a pair of oppositely arranged annular mold sections adapted to be brought together in closed relation and formed with bead seats, said sections enclosing a mold cavity of fixed size and being formed at their outer periphery with bearing surfaces arranged to contact endwise substantially in the median circumferential plane of the tire when the sections are in closed relation, and the inner peripheral wall of one section being provided with a ring portion projecting axially for a substantial distance beyond said median circumferential plane and abutting endwise against the mating section.

9. A tire vulcanizing device including, in combination, a pair of oppositely arranged separable annular mold sections formed with bead seats and beveled or chamfered portions leading to said seats, and a cone-shaped ring arranged between said sections immediately adjacent the bead seats, as and for the purpose described.

In witness whereof, I have hereunto signed my name.

Signed at Akron, in the county of Summit and State of Ohio, U. S. A., this 20th day of May, 1930.

JOHN R. GAMMETER.